(12) United States Patent
Poole

(10) Patent No.: US 11,429,947 B2
(45) Date of Patent: Aug. 30, 2022

(54) SYSTEMS AND METHODS FOR TRANSACTION PRE-AUTHENTICATION

(71) Applicant: Capital One Services, LLC., McLean, VA (US)

(72) Inventor: Thomas Poole, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/511,710

(22) Filed: Jul. 15, 2019

(65) Prior Publication Data

US 2020/0019950 A1    Jan. 16, 2020

Related U.S. Application Data

(63) Continuation of application No. 14/749,233, filed on Jun. 24, 2015, now Pat. No. 10,380,575.
(Continued)

(51) Int. Cl.
*G06Q 20/22* (2012.01)
*G06Q 20/32* (2012.01)
(Continued)

(52) U.S. Cl.
CPC ......... *G06Q 20/227* (2013.01); *G06Q 20/325* (2013.01); *G06Q 20/326* (2020.05); *G06Q 20/34* (2013.01); *G06Q 20/425* (2013.01)

(58) Field of Classification Search
CPC ........ G06Q 20/12; G06Q 20/40; G06Q 40/02; G06Q 20/023; G06Q 20/24; G06Q 20/3224; G06Q 30/06; G06Q 40/00; G06Q 20/04; G06Q 20/123; G06Q 20/1235; G06Q 20/14; G06Q 20/20; G06Q 20/322; G06Q 20/401; G06Q 20/42; G06Q 20/18; G06Q 20/202; G06Q 20/204; G06Q 20/26; G06Q 20/3223; G06Q 20/341; G06Q 20/367; G06Q 20/3674; G06Q 20/382; G06Q 20/40145; G06Q 20/405; G06Q 20/40975; G06Q 30/0241; G06Q 30/0601; G06Q 20/227;
(Continued)

(56) References Cited

U.S. PATENT DOCUMENTS

| | | | | |
|---|---|---|---|---|
| 6,434,238 | B1 * | 8/2002 | Chaum | G06Q 20/382 380/45 |
| 6,658,568 | B1 * | 12/2003 | Ginter | H04N 7/162 380/231 |

(Continued)

*Primary Examiner* — Slade E Smith
(74) *Attorney, Agent, or Firm* — Perkins Coie LLP

(57) ABSTRACT

Systems, methods, and computer-readable media are provided for mobile-based transaction pre-authorization. One example method comprises receiving, from a device (such as a mobile device), a pre-authorization request including at least selection of a payment method, and generating a pre-authorization for a purchase based on the selected payment method. The method further comprises receiving a transaction request, determining whether the received transaction request is associated with the pre-authorization, and processing the transaction request based on the determination. Systems and computer-readable media implementing the above method are also provided. User interfaces are also provided for enabling the use of such methods, systems, and computer-readable media on, for example, mobile devices.

19 Claims, 8 Drawing Sheets

Related U.S. Application Data

(60) Provisional application No. 62/017,486, filed on Jun. 26, 2014.

(51) Int. Cl.
*G06Q 20/34* (2012.01)
*G06Q 20/42* (2012.01)

(58) Field of Classification Search
CPC ...... G06Q 20/32; G06Q 20/325; G06Q 20/34; G06Q 20/425; H04L 2209/56; H04L 2463/101; H04L 2463/102; H04L 2463/103; H04L 63/20; H04L 12/40104; H04L 12/40117; H04L 2209/30; H04L 2209/38; H04L 2209/60; H04L 2209/603; H04L 2209/84; H04L 63/04; H04L 63/068; H04L 63/0823; H04L 63/10; H04L 9/321; H04L 9/3257; H04L 9/3263; G06F 21/10; G06F 21/31; G06F 21/33; G06F 21/86; G06F 2211/007; G06F 2221/0737; G06F 2221/0797; G06F 12/1408; G06F 2221/2101; G06F 2221/2135; G06F 2221/2151; G06F 12/1483; G06F 21/606; G06F 2221/2115; G06T 1/0021; G07F 9/026; G07F 19/208; G07F 7/1008; H04N 21/2347; H04N 21/23476; H04N 21/235; H04N 21/2362; H04N 21/2541; H04N 21/2543; H04N 21/2547; H04N 21/25875; H04N 21/4143; H04N 21/4345; H04N 21/435; H04N 21/4405; H04N 21/442; H04N 21/443; H04N 21/4627; H04N 21/4753; H04N 21/6581; H04N 21/835; H04N 21/8355; H04N 21/83555; H04N 21/8358; H04N 7/162; H04N 7/17309; H04N 21/8166; C02F 1/00; D01G 21/00; D06C 3/00; G01S 19/42; G11B 20/00086; G11B 20/00159; G11B 20/00188; G11B 20/00557; G11B 20/0071; G11B 20/00768; G11B 2220/216; G11B 2220/218; G11B 2220/2562; G11B 2220/2575; G11B 27/031; G11B 27/329; Y10S 707/99939
USPC .......................................................... 705/44
See application file for complete search history.

(56) References Cited

U.S. PATENT DOCUMENTS

| | | | |
|---|---|---|---|
| 8,280,776 B2 | 10/2012 | Coulter et al. | |
| 8,805,737 B1* | 8/2014 | Chen | G06Q 40/00 235/380 |
| 9,311,638 B1* | 4/2016 | Daniel | G06Q 20/354 |
| 9,641,526 B1* | 5/2017 | Gopalakrishnan | H04L 63/0876 |
| 9,652,772 B1* | 5/2017 | Eyges | G06Q 20/4016 |
| 9,679,305 B1* | 6/2017 | Bhat | G06Q 30/06 |
| 2003/0195859 A1* | 10/2003 | Lawrence | G06Q 20/401 705/75 |
| 2003/0229584 A1* | 12/2003 | Brown | G06Q 20/06 705/39 |
| 2005/0060584 A1* | 3/2005 | Ginter | G06Q 20/123 375/E7.009 |
| 2006/0131385 A1* | 6/2006 | Kim | G06Q 20/425 235/379 |
| 2006/0131390 A1* | 6/2006 | Kim | G06Q 40/00 235/380 |
| 2007/0063017 A1* | 3/2007 | Chen | G06Q 20/40 235/379 |
| 2007/0179865 A1* | 8/2007 | Hibler | G06Q 20/02 705/26.35 |
| 2007/0246528 A1* | 10/2007 | Kubo | G06Q 20/403 235/380 |
| 2007/0250392 A1* | 10/2007 | Paulsen | G06Q 20/4016 705/19 |
| 2007/0250440 A1* | 10/2007 | Paulsen | G06Q 40/02 705/39 |
| 2008/0126258 A1* | 5/2008 | Jacobs | G06Q 20/322 705/64 |
| 2008/0228613 A1* | 9/2008 | Alexander | G06Q 20/102 705/35 |
| 2008/0313047 A1* | 12/2008 | Casares | G06Q 20/40 705/16 |
| 2009/0070265 A1* | 3/2009 | Hrabosky | G06Q 20/26 705/35 |
| 2009/0100168 A1* | 4/2009 | Harris | G06F 15/16 709/224 |
| 2009/0164354 A1* | 6/2009 | Ledbetter | G06Q 20/12 705/30 |
| 2009/0171842 A1* | 7/2009 | Blythe | G06Q 20/3224 342/357.22 |
| 2009/0177563 A1* | 7/2009 | Bernstein | G06Q 40/12 705/30 |
| 2009/0265241 A1* | 10/2009 | Bishop | G06Q 20/403 705/14.38 |
| 2009/0265250 A1* | 10/2009 | Bishop | G06Q 20/202 705/44 |
| 2009/0271277 A1* | 10/2009 | Bishop | G06Q 40/025 705/21 |
| 2009/0271278 A1* | 10/2009 | Bishop | G06Q 20/403 235/380 |
| 2010/0010930 A1* | 1/2010 | Allen | G06Q 40/025 705/38 |
| 2010/0106611 A1* | 4/2010 | Paulsen | G07F 17/32 705/40 |
| 2010/0125470 A1* | 5/2010 | Chisholm | G06Q 20/40 705/35 |
| 2010/0211503 A1* | 8/2010 | Reiss | G06Q 40/00 705/35 |
| 2010/0280950 A1* | 11/2010 | Faith | G06Q 20/40 705/44 |
| 2010/0287099 A1* | 11/2010 | Liu | G06Q 20/40 235/380 |
| 2010/0312657 A1* | 12/2010 | Coulter | G06Q 20/20 705/16 |
| 2011/0196791 A1* | 8/2011 | Dominguez | G06Q 40/00 705/44 |
| 2012/0023567 A1* | 1/2012 | Hammad | G06Q 20/4018 726/9 |
| 2012/0036073 A1* | 2/2012 | Basu | G06Q 20/42 705/44 |
| 2012/0041876 A1* | 2/2012 | Nosek | G06Q 40/00 705/42 |
| 2012/0066133 A1* | 3/2012 | Bernstein | G06Q 40/12 705/44 |
| 2012/0216244 A1* | 8/2012 | Kumar | G06F 21/57 726/1 |
| 2012/0330788 A1* | 12/2012 | Hanson | G06Q 40/02 705/26.41 |
| 2013/0001304 A1* | 1/2013 | Xu | G06Q 20/38215 235/380 |
| 2013/0006860 A1* | 1/2013 | Balasubramanian | G06Q 20/12 705/44 |
| 2013/0030934 A1* | 1/2013 | Bakshi | H04L 63/107 705/18 |
| 2013/0046692 A1* | 2/2013 | Grigg | G06Q 40/00 705/44 |
| 2013/0253965 A1* | 9/2013 | Joseph | G06Q 20/4016 705/5 |
| 2013/0304637 A1* | 11/2013 | McCabe | G06Q 40/02 705/39 |
| 2014/0046737 A1* | 2/2014 | Graves | G06Q 20/354 705/13 |

(56) References Cited

U.S. PATENT DOCUMENTS

| | | | |
|---|---|---|---|
| 2014/0046744 A1* | 2/2014 | Hagey | G06Q 20/387 705/14.23 |
| 2014/0101046 A1* | 4/2014 | O'Connor | G06Q 20/12 705/44 |
| 2014/0122331 A1* | 5/2014 | Vaish | G06Q 20/4018 705/41 |
| 2014/0195425 A1* | 7/2014 | Campos | G06Q 20/3674 705/41 |
| 2014/0207673 A1* | 7/2014 | Jeffries | G06Q 20/1085 705/43 |
| 2014/0207674 A1* | 7/2014 | Schroeder | G06Q 20/4016 705/43 |
| 2014/0222616 A1* | 8/2014 | Siemiatkowski | G06Q 30/0613 705/26.8 |
| 2014/0316984 A1* | 10/2014 | Schwartz | G06Q 20/322 705/44 |
| 2014/0316988 A1* | 10/2014 | Nosek | G06Q 40/06 705/44 |
| 2014/0337218 A1* | 11/2014 | Anand | G06Q 20/023 705/44 |
| 2015/0019435 A1* | 1/2015 | Ovick | G06Q 20/047 705/44 |
| 2015/0058220 A1* | 2/2015 | Cazanas | G06Q 20/023 705/44 |
| 2015/0095215 A1* | 4/2015 | Clarke | G06Q 20/02 705/39 |
| 2015/0220920 A1* | 8/2015 | Howe | G06Q 20/40 705/44 |
| 2015/0235207 A1* | 8/2015 | Murphy, Jr. | G06Q 20/4016 705/44 |
| 2015/0235219 A1* | 8/2015 | Murphy, Jr. | G06Q 20/4016 705/75 |
| 2015/0235220 A1* | 8/2015 | Murphy, Jr. | G06Q 20/4016 705/75 |
| 2015/0269582 A1 | 9/2015 | Simmons | |
| 2015/0287017 A1 | 10/2015 | Iqbal et al. | |
| 2019/0251590 A1* | 8/2019 | Bodington | G06Q 30/02 |
| 2019/0266339 A1* | 8/2019 | Kursun | G06F 21/6209 |

* cited by examiner

SYSTEMS AND METHODS FOR TRANSACTION PRE-AUTHENTICATION

RELATED APPLICATIONS

This application is a continuation of U.S. patent application Ser. No. 14/749,233, filed Jun. 24, 2015 (currently pending), which claims priority from U.S. Provisional Patent Application No. 62/017,486, filed on Jun. 26, 2014, the contents of which are hereby incorporated by reference in the present application.

BACKGROUND

Financial service providers regularly provide accounts to consumers that enable the consumers to purchase goods against a line of credit. The understanding with such accounts is that when the consumer makes an authorized purchase at a merchant, the financial service provider pays the merchant for the purchase, and the consumer will pay the financial service provider back at some point in the future. At times, however, consumers may lose their credit cards or otherwise lose control of their accounts, meaning that an unauthorized individual could make fraudulent purchases using the account.

Often times, the risk of fraudulent transactions is borne by the financial service provider. Thus, many financial service providers have implemented fraud systems that attempt to determine whether a transaction is fraudulent. For example, if a financial service provider receives a $20.00 transaction request from a McDonald's in Arlington, Va. on Monday morning and also receives a $2,500.00 transaction request from a Home Plus store in Seoul, South Korea 20 minutes later, the financial service provider can deny one or both transaction requests because an authorized user cannot have traveled between both purchase locations in that short amount of time.

But most cases of fraud are not so obvious, and many fraud detection systems are known to have an unacceptably high false positive rate. Thus, transaction requests that are legitimate may be improperly denied. For example, if a consumer attempts to purchase a new television, the purchase may appear out of the ordinary when compared to the consumer's other purchases. The transaction may thus be denied even if the consumer has sufficient credit to make the purchase. This causes inconvenience for the consumer.

There is thus a need to address these and other issues. The present disclosure provides methods, systems, and computer-readable media to solve these and other issues.

SUMMARY

Disclosed embodiments include methods, systems, and computer-readable media configured to, for example, enable pre-authorization of transactions that might otherwise be denied as potentially fraudulent.

In one aspect, a method of pre-authorization is provided. The method comprises receiving, from a device, a pre-authorization request including at least selection of a payment method, and generating a pre-authorization for a purchase based on the selected payment method. The method further comprises receiving a transaction request, determining whether the received transaction request is associated with the pre-authorization, and processing the transaction request based on the determination. Systems and computer-readable media implementing the above method are also provided.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
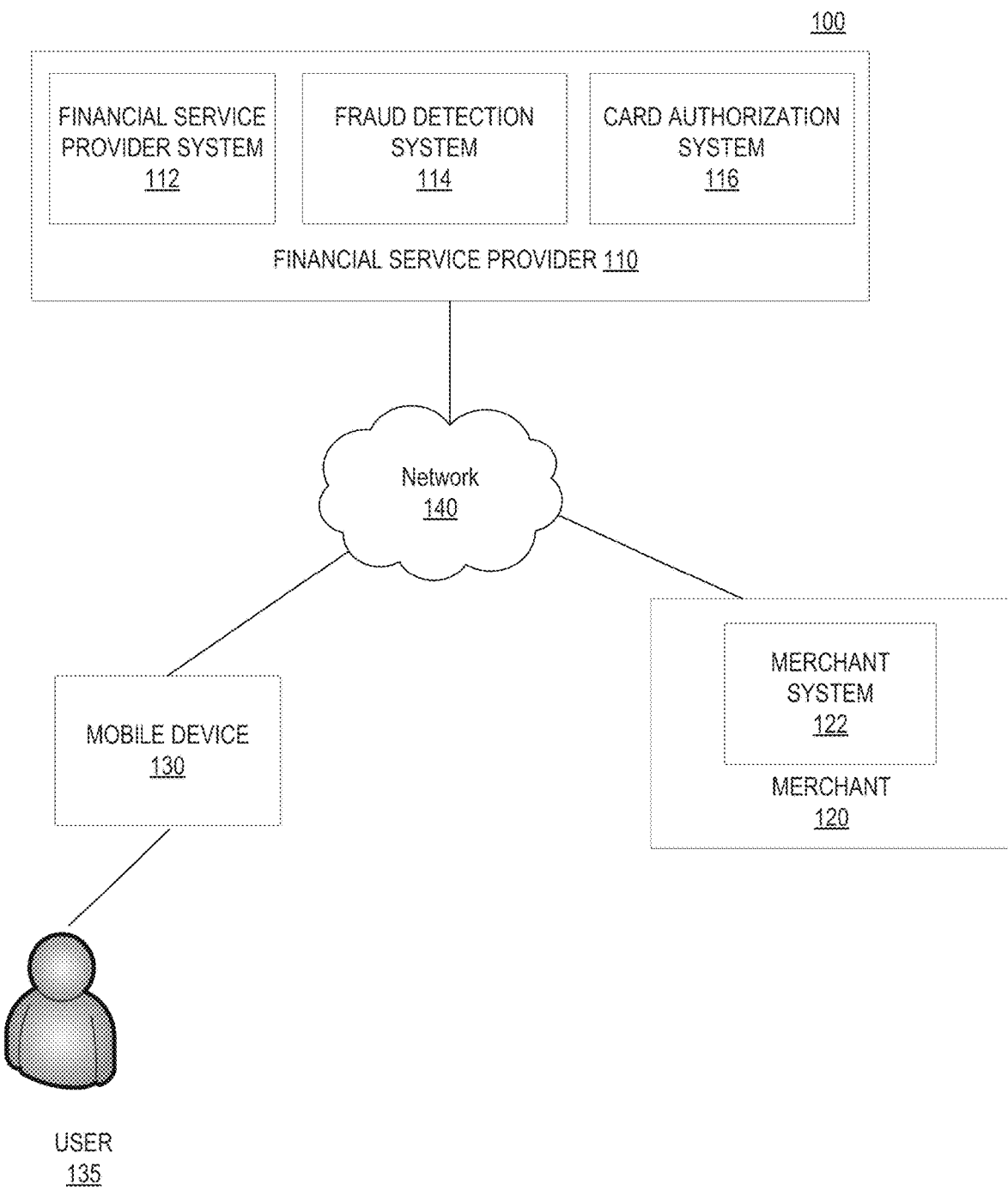
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service providers 110, one or more merchants 120, one or more mobile devices 130, and network 140. The components and arrangement of the components included in system 100 may vary. Thus, system 100 may include other components that perform or assist in the performance of one or more processes consistent with the disclosed embodiments.

Components of system 100 may be computing systems configured to provide systems and method for pre-authorizing a transaction request, consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with financial service provider 110, merchant 120, and/or mobile device 130. In certain aspects, users (e.g., user 135) may operate one or more components of system 100 to initiate and provide input for one or more operations consistent with the disclosed embodiments.

Financial service provider 110 may be an entity that provides, maintains, manages, or otherwise offers financial services. For example, financial service provider 110 may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, or the like. Consistent with certain disclosed embodiments, financial service provider 110, using financial service provider system 112, may provide manufacturer-based financial service accounts, which may be financial service accounts that are associated with a manufacturer of products or services, such as a merchant 120.

Financial service provider 110 may include one or more financial service provider systems 112. In one aspect, financial service provider system 112 may be one or more computing devices configured to perform one or more operations consistent with disclosed embodiments. In one aspect, financial service provider system 112 may be a desktop computer, a server, or any other type of computing device. Financial service provider system 112 may include one or more processors configured to execute software instructions stored in memory. The one or more processors may be configured to execute software instructions that when executed by a processor performs known Internet-related communication and financial service-based processes. For instance, financial service provider system 112 may execute software that provides data used for generating and displaying interfaces, including content on a display device included in, or connected to, mobile device 130. Financial service provider system 112 may also receive transaction requests from merchant 120 and/or network 140, and may send these transaction requests to fraud detection system 114 and/or card authorization system 116 for processing. Financial service provider system 112 may send responses to the received transaction requests to mobile device 130, merchant 120, and/or network 140.

Financial service provider 110 may include one or more fraud detection systems 114. In one aspect, fraud detection system 114 may be one or more computing devices configured to perform one or more operations consistent with disclosed embodiments. For example, fraud detection system 114 may be a desktop computer, a server, or any other type of computing device. Fraud detection system 114 may include one or more processors configured to execute software instructions stored in memory. The one or more processors may be configured to execute software instructions that when executed by the one or more processors perform methods that enable the detection of potentially fraudulent transaction requests. For instance, fraud detection system 114 may receive a transaction request from financial service provider system 112 or card authorization system 116 and may determine whether the received transaction request is potentially fraudulent.

Fraud detection system 114 may check the transaction request for fraudulence using known or as-yet-unknown processes—including those based on geographic location of merchant 120 or user 135, a dollar amount associated with the transaction request, a frequency or number of transaction requests associated with user 135, etc. Checking the transaction request may comprise generating a cumulative score relating to each transaction request and comparing it to one or more thresholds. For example, fraud detection system 114 may utilize three thresholds to determine fraudulence associated with a transaction request, such as a first threshold representing the highest possible score for a transaction request, a second threshold representing the lowest score at which a transaction request that is not pre-authorized (e.g., where no associated pre-authorization exists) can be approved, and/or a third threshold representing the lowest score at which a pre-authorized transaction request can be approved. So, for example, if a transaction request is pre-authorized using mobile device 130, then the transaction request may be approved if an associated score is lower than the first threshold and the second threshold but higher than the third threshold, while a transaction request that is not pre-authorized may only be approved if an associated score is lower than the first threshold but higher than the second threshold. In some embodiments, fraud detection system 114 may receive an indication from card authorization system 116 indicative of whether a received transaction request is associated with a pre-authorization request.

In addition, in some embodiments, fraud detection system 114 may check the transaction request for different characteristics based on whether the transaction request is associated with a pre-authorization. For example, fraud detection system 114 may perform one set of checks on transaction requests that are not associated with a pre-authorization, while fraud detection system 114 may perform only a subset of that set of checks on transaction requests that are associated with a pre-authorization.

Financial service provider 110 may include one or more card authorization systems 116. In one aspect, card authorization system 116 may be one or more computing devices configured to perform one or more operations consistent with disclosed embodiments. For example, card authorization system 116 may be a desktop computer, a server, or any other type of computing device. Card authorization system 116 may include one or more processors configured to execute software instructions stored in memory. The one or more processors may be configured to execute software instructions that when executed by the one or more processors perform methods that enable the processing of financial transaction authorization requests.

For instance, card authorization system 116 may receive a transaction request from fraud authorization system 114 and/or financial service system 112, and determine whether a received transaction request matches a pre-authorization. This comprises, for example, determining whether a transaction request includes a reference to a particular card or account and/or whether that particular card or account is associated with a pre-authorization. Determining whether a received transaction request is associated with a pre-authorization also comprises, in some embodiments, determining whether a dollar value associated with the pre-authorization is within some percentage (e.g., 10%) of a dollar value associated with the transaction. Card authorization system 116 may also communicate to fraud detection system 114 whether or not a transaction request is associated with a previously-requested pre-authorization and/or should be authorized.

In some embodiments, one or both of fraud detection system 114 and card authorization system 116 may be configured to require that a transaction request be associated with a pre-authorization before approving the transaction request. In other embodiments, one or both of fraud detection system 114 and card authorization system 116 may be configured to require that transaction requests of a certain type (e.g., above a certain associated dollar value, at a particular merchant, associated with particular goods or services, or when merchant 120 or user 135 is in a particular geographic location) be associated with a pre-authorization before approval.

Merchant 120 may be an entity that offers goods, services, and/or information, such as a retailer (e.g., Macy's®, Target®, Amazon.com®, etc.), grocery store, service provider (e.g., utility company, etc.), or any other type of entity that offers goods, services, and/or information that consumers (e.g., end-users or other business entities, such as user 135) may purchase, consume, use, etc. Merchant 120 may offer for sale one or more products of product manufacturer 120. In one example, merchant 120 may be associated with a brick and mortar retail location. In another example, merchant 120 may comprise an online merchant that sells goods through the Internet or another network (such as network 140). Merchant 120 may also include back- and/or front-end computing components that store data and execute software instructions to perform operations consistent with disclosed embodiments, such as computers that are operated by employees of the merchant (e.g., back office systems, etc.).

Merchant 120 may include merchant system 122. Merchant system 122 may include one or more computing systems, such as server(s), desktop computers, etc., that are configured to execute stored software instructions to perform operations associated with a merchant, including one or more processes associated with processing purchase transaction requests, generating transaction request data, generating product data (e.g., SKU data) relating to transaction requests, etc. Merchant system 122 may perform one or more operations consistent with the disclosed embodiments. In one example, merchant system 122 may comprise a point-of-sale device (for example, at a brick and mortar location). In another example, merchant system 122 is a web site operated by or on behalf of merchant 120 that enables a consumer (e.g., user 135) to receive information about goods or services for sale and initiate a purchase for those goods or services. The disclosed embodiments are not limited to any particular configuration of merchant system 122.

Mobile device 130 may be one or more computing devices configured to perform one or more operations consistent with disclosed embodiments. in one example, mobile device 130 may be a tablet, a smart phone, a cellular phone, a personal digital assistant (PDA), a media device (such as an iPod®), or any other type of computing device. As mentioned herein, however, the disclosed embodiments are not limited to such examples.

Mobile device 130 may include one or more processors configured to execute software instructions stored in memory, such as memory included in mobile device 130. Mobile device 130 may include software that when executed by a processor performs known Internet-related communication, content display processes, and financial service-related processes for a user of mobile device 130. For instance, mobile device 130 may execute browser or related mobile display software that generates and displays interfaces including content on a display device included in, or in communication with, mobile device 130. Mobile device 130 may execute applications and/or communication software that allows mobile device 130 to communicate with components over network 140, and generates and displays content in interfaces via a display device included in mobile device 130. The disclosed embodiments are not limited to any particular configuration of mobile device 130. In some embodiments, mobile device 130 may be configured to execute software instructions relating to location services, such as determining a location using GPS or WiFi® networks. For example, mobile device 130 may be configured to determine a geographic location of mobile device 130 (and associated user 135) and provide corresponding location data and time stamp data.

In some embodiments, mobile device 30 is configured to interact with merchant 120 or merchant system 122 to effect a pre-authorization or transaction request. This includes, for example, user 135 operating mobile device 130 to browse a website hosted by merchant 120, mobile device 130 communicating card information to merchant system 122, or the like.

Network 140 may be any type of network configured to provide communications between components of system 100. For example, network 140 may be any type of network (including infrastructure) that provides communications, exchanges information, and/or facilitates the exchange of information, such as the Internet, a Local Area Network, Near-Field Communication (NFC), Bluetooth, Optical code scanner, or other suitable connection(s) that enables the sending and receiving of information between the components of system 100. In other embodiments, one or more components of system 100 may communicate directly through a dedicated communication link(s), such as links between financial service provider 110, merchant 120, and/or mobile device 130.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, financial service provider system 112 and merchant system 122 may constitute a part of components of system 100 other than those specifically described, or may constitute a part of multiple components of system 100 (i.e., a distributed system).

Figure 2:
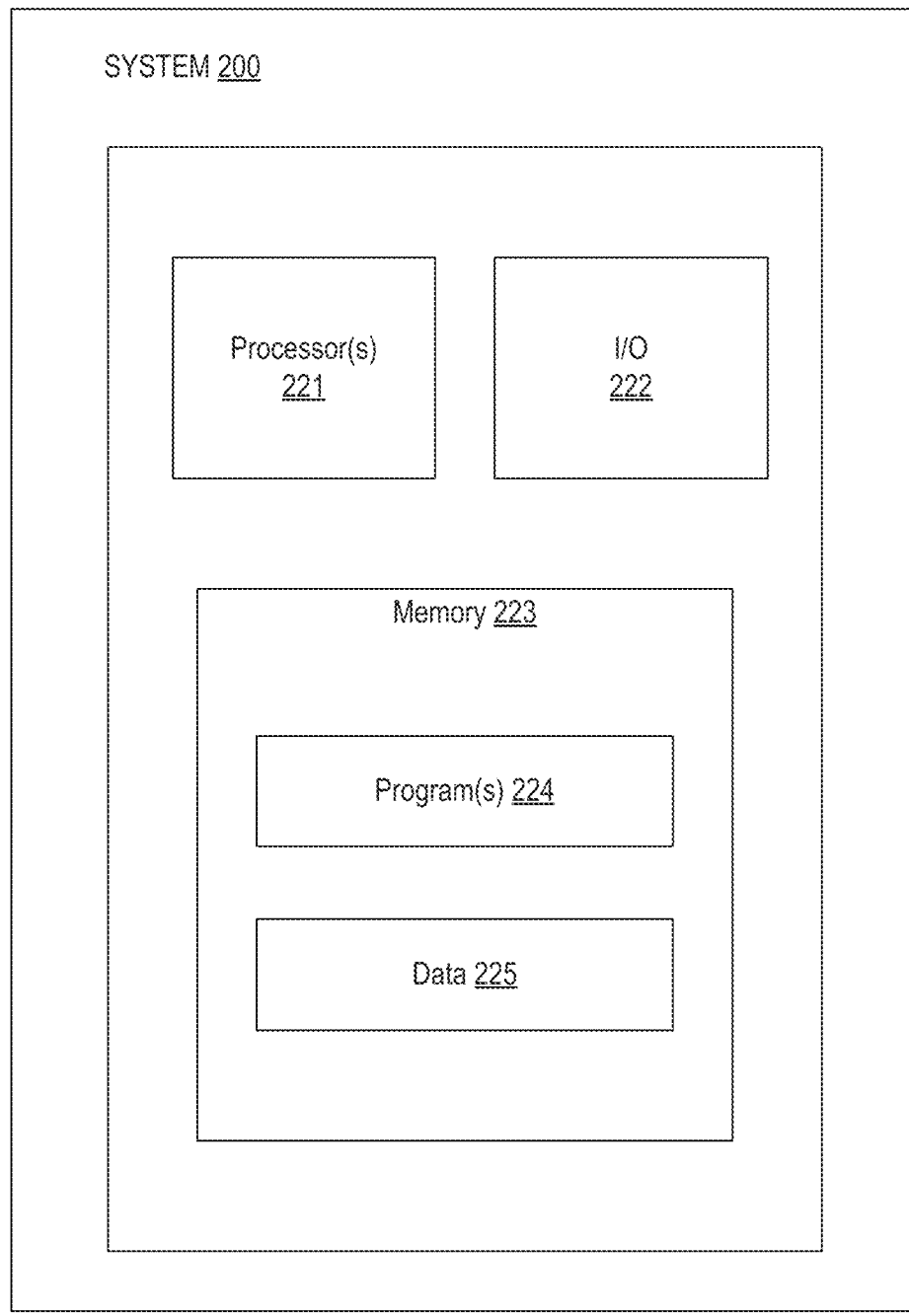
FIG. 2 is a diagram of an exemplary electronic system, consistent with disclosed embodiments.

FIG. 2 shows an exemplary electronic system 200 consistent with disclosed embodiments. Variations of exemplary system 200 may be used to implement portions or all of financial service provider 110, merchant 120, and/or mobile device 130. In one embodiment, system 200 may comprise one or more processors 221, one or more input/output (I/O) devices 222, and one or more memories 223. In some embodiments, system 200 may take the form of a server, general purpose computer, mainframe computer, or the like. In some embodiments, system 200 may take the form of a mobile computing device such as a smartphone, tablet, laptop computer, or the like. Alternatively, system 200 may be configured as a particular apparatus, embedded system, dedicated circuit, or the like, based on the storage, execution, and/or implementation of the software instructions that perform one or more operations consistent with the disclosed embodiments.

Processor(s) 221 may include one or more known processing devices, such as mobile device microprocessors, desktop microprocessors, server microprocessors, or the like. The disclosed embodiments are not limited to a particular type of processor.

Memory 223 may include one or more storage devices configured to store instructions usable by processor 221 to perform functions related to the disclosed embodiments. For example, memory 223 may be configured with one or more software instructions, such as program(s) 224 that perform one or more operations when executed by processor 221. The disclosed embodiments are not limited to separate programs or computers configured to perform dedicated tasks. For example, memory 223 may include a single program or multiple programs that perform the functions of mobile device 130. Memory 223 may also store data 225 that is used by one or more programs 224.

Figure 3A:
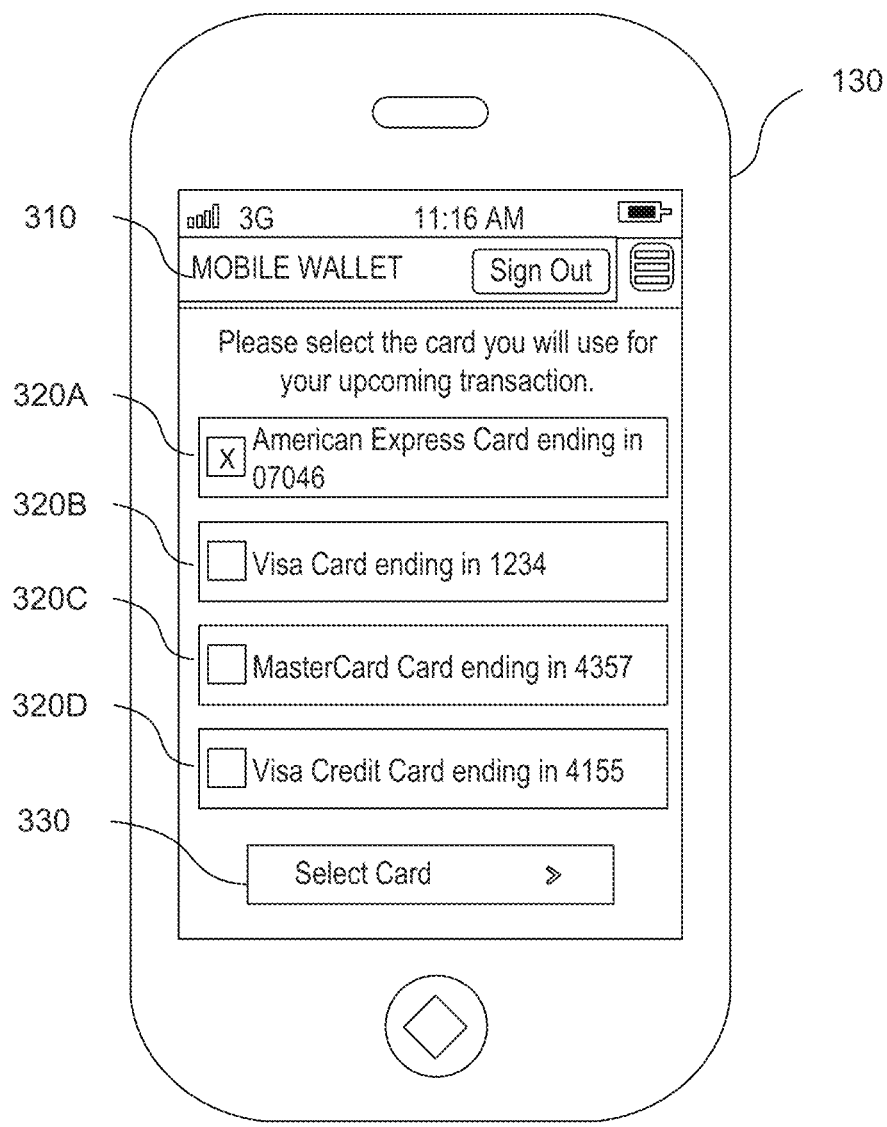
FIG. 3A is a diagram of an exemplary interface displaying choices of cards that a user can use in accomplishing a transaction request, consistent with disclosed embodiments.
Figure 3B:
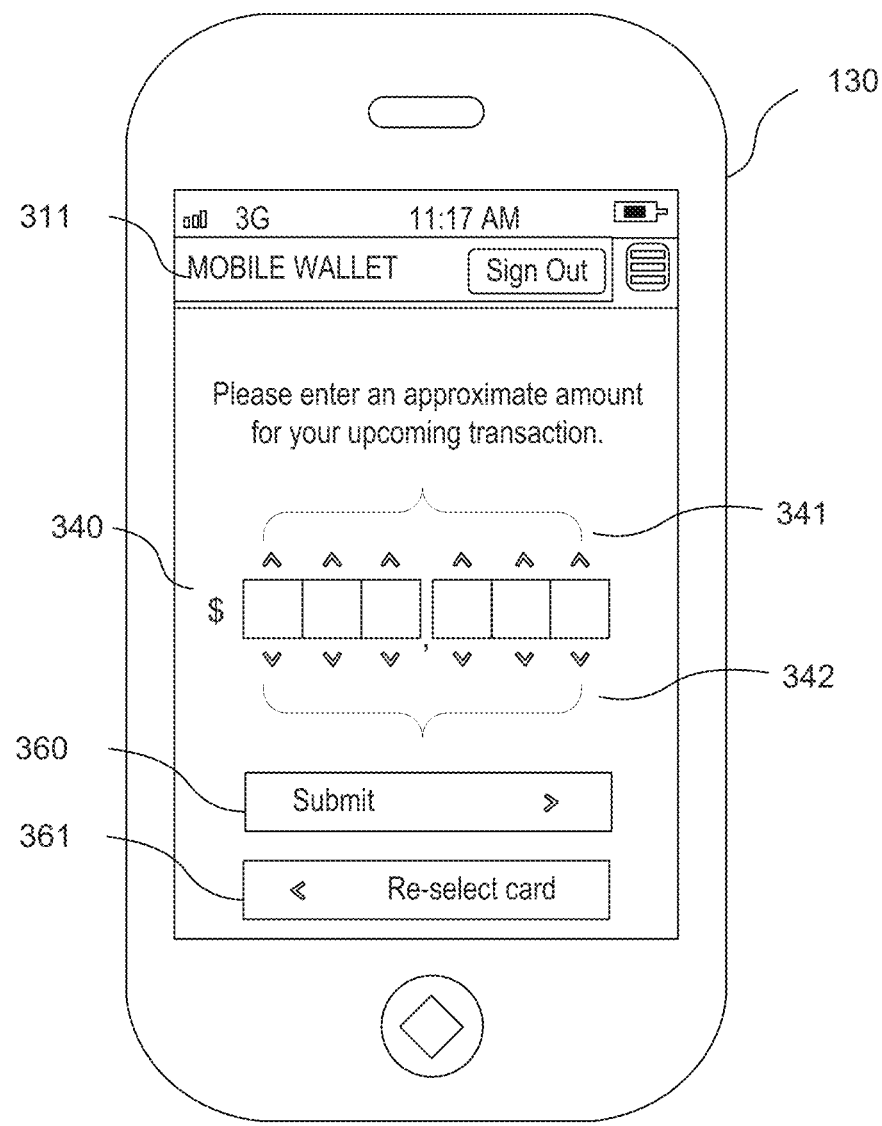
FIG. 3B is a diagram of an exemplary interface requesting an approximate amount for a transaction request, consistent with disclosed embodiments.
Figure 3C:
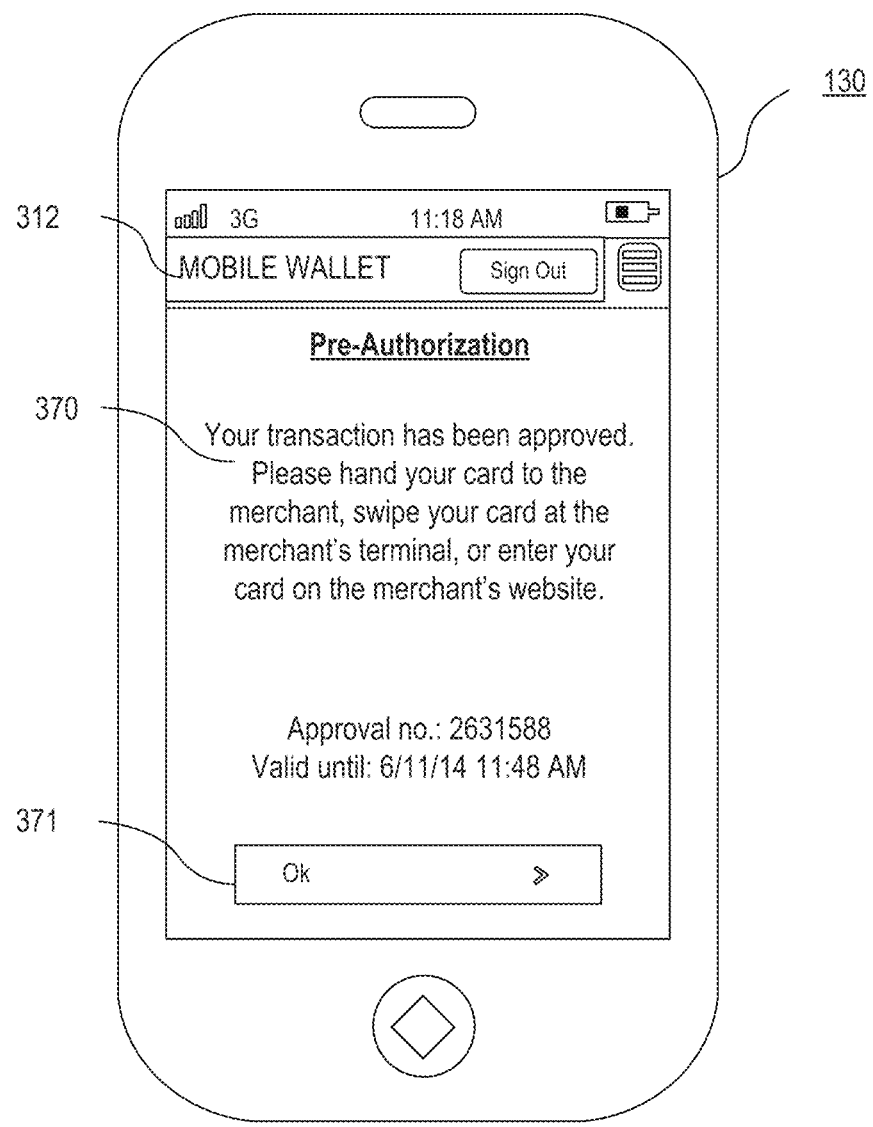
FIG. 3C is a diagram of an exemplary interface displaying a confirmation that a pre-authorization request has been approved, consistent with disclosed embodiments.
Figure 4A:
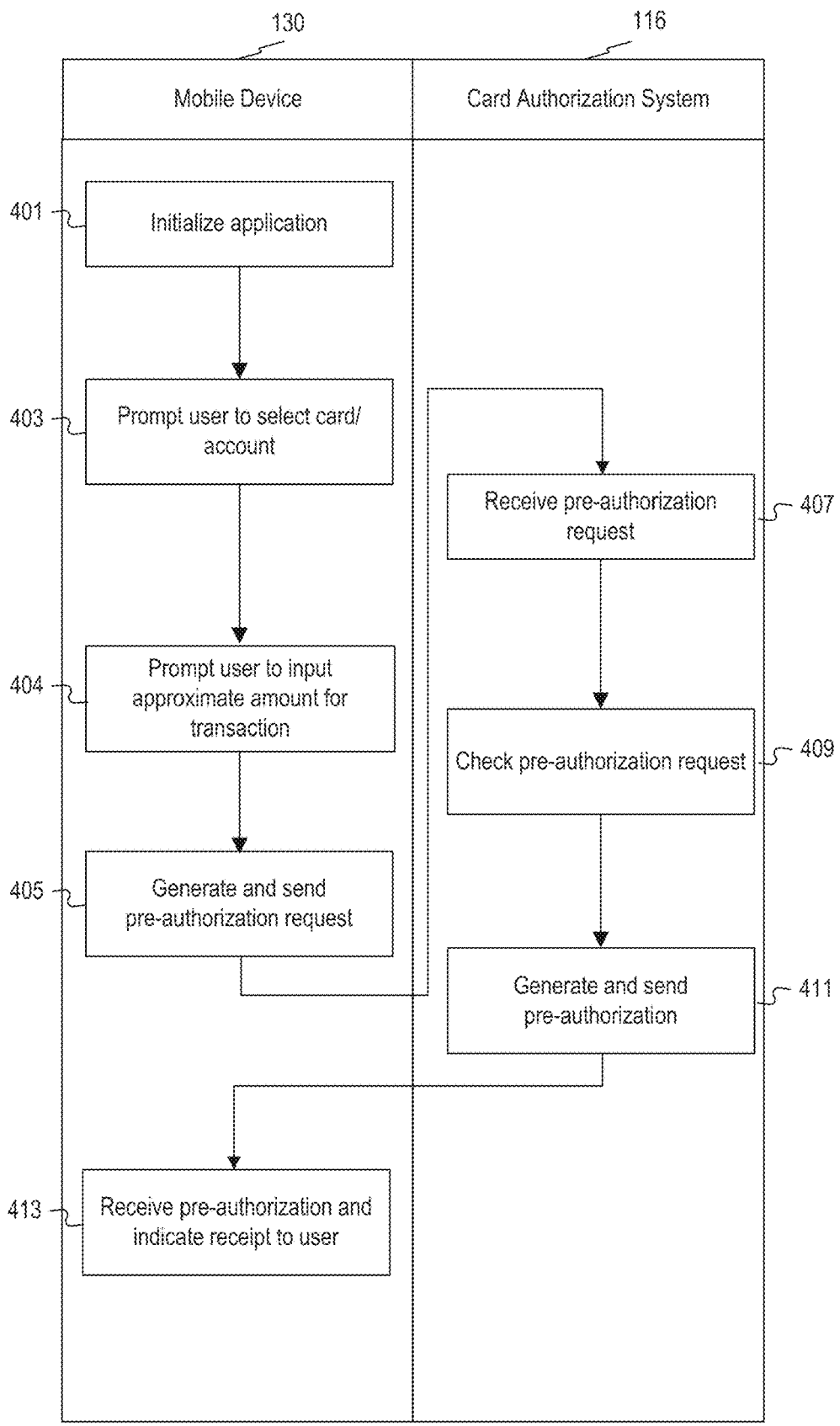
FIG. 4A is a flowchart of an exemplary process for pre-authorizing a transaction request using a mobile device, consistent with disclosed embodiments.
Figure 4B:
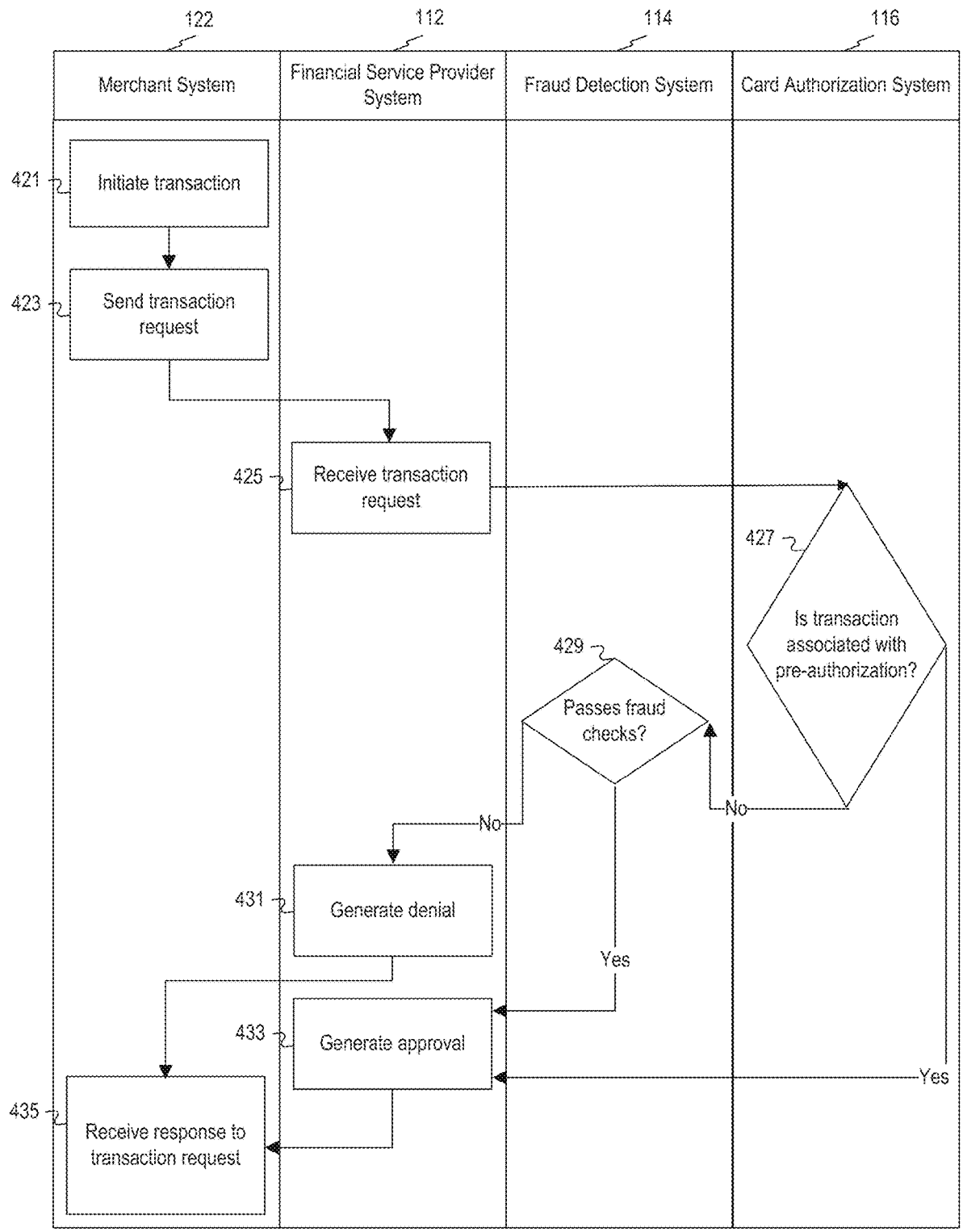
FIG. 4B is a flowchart of an exemplary process for processing a transaction request initiated at a merchant system, consistent with disclosed embodiments.

In certain embodiments, memory 223 may store software executable by processor(s) 221 to perform one or more methods, such as the methods associated with user interfaces in FIGS. 3A-3C and/or the methods represented by the flowcharts depicted in FIGS. 4A and 4B.

I/O devices 222 may be one or more devices configured to allow data to be received and/or transmitted by system 200. I/O devices 222 may include one or more digital and/or analog devices that allow system 200 to communicate with other machines and devices, such as other components of system 100. For example, I/O devices 222 may include a screen for displaying messages to user 135. I/O devices 222 may also include one or more digital and/or analog devices that allow a user to interact with system 200 such as a touch-sensitive area, keyboard, buttons, or microphones. I/O devices 222 may also include other components known in the art for interacting with a user. I/O devices 222 may also include one or more hardware/software components for communicating with other components of system 100. For example, I/O devices 222 may include a wired network adapter, a wireless network adapter, a cellular network adapter, or the like. Such network components enable system 200 to communicate with other systems to send and receive data.

The components of system 200 may be implemented in hardware, software, or a combination of both hardware and software, as will be apparent to those skilled in the art. For example, although one or more components of system 200 may be implemented as computer processing instructions, all or a portion of the functionality of system 200 may be implemented instead in dedicated electronics hardware.

FIG. 3A is a diagram of an exemplary interface 310 displaying choices of cards that a user can use in accomplishing a pre-authorization request. In exemplary FIG. 3A, interface 310 is depicted as being displayed on mobile device 130 as part of a mobile wallet application. It is to be understood, however, that not all embodiments require interface 310 to be implemented as part of a mobile wallet application. For example, interface 310 can be displayed on mobile device 130, a personal computer, or the like, as part of a web site hosted by financial service provider system 112.

Mobile device 130 may present interface 310 to user 135, enabling user 135 to select which card will be used in an upcoming transaction. Cards 320A-320D may constitute credit cards, debit cards, charge cards, other payment cards, stored value cards, or other cards. In alternative embodiments, cards 320A-320D may include non-card accounts as well, including charge accounts, checking accounts, savings accounts, lines of credit, or the like.

In some embodiments, mobile device 130 may present interface 310 to user 135 when user 135 opens the mobile wallet application, opens another application, opens a web site to select a card, and/or performs some other action that indicates that user 135 may desire to make a purchase.

User 135 may select one of cards 320A-320D by actuating the selected card (e.g., by pressing on a screen on mobile device 130 or moving a keypad to select the desired card). Interface 310 may then receive a press at button 330 to select that card for the transaction. In some embodiments, after receiving a press at button 330, the next interface shown on mobile device 130 may include another interface, such as the interface depicted in FIG. 3B, while in other embodiments, the next interface shown on mobile device 130 may be the interface depicted in FIG. 3C.

FIG. 3B is a diagram of an exemplary interface 311 requesting an approximate amount for a pre-authorization request, consistent with disclosed embodiments. In exemplary FIG. 3B, interface 311 is depicted as being displayed on mobile device 130 as part of a mobile wallet application. It is to be understood, however, that not all embodiments require interface 311 to be implemented as part of a mobile wallet application. For example, interface 311 can be displayed on mobile device 130, a personal computer, or the like, as part of a web site hosted by financial service provider system 112. According to some embodiments, mobile device 130 may further present an interface (not shown) requesting an indication of the merchant with which user 135 intends to complete a transaction and/or a location (e.g., a zip code, location, or website) where user 135 intends to complete the transaction.

In some embodiments, interface 311 may be presented to user 135 after user 135 has selected a card 320A-320D and pressed button 330, as shown in FIG. 3A. Interface 311 may include a dollar field 340, a set of up arrows 341, a set of down arrows 342, a submit button 360, and/or a back button 361.

Interface 311 may receive a selection from user 135 regarding an approximate amount for an upcoming transaction request. While in some situations user 135 will not know an exact amount of an upcoming transaction (because of, for example, tax or shipping and handling), user 135 may be able to guess within 10% of the actual amount for the transaction. Thus, in some embodiments, interface 311 may provide up arrows 341 and down arrows 342 to enable user 135 to select an approximate dollar amount within, for example, 10% of the actual amount of an upcoming transaction. In other embodiments, interface 311 may receive inputted digits in dollar field 340 to indicate approximately how much user 135 believes the transaction will be. Upon receipt of a button press at button 360, mobile device 130 may send the card selected in FIG. 3A (e.g., one of cards 320A-320D) and the value in dollar field 340. Alternatively, interface 311 may receive a button press at button 361, if, for example, user 135 selected an incorrect card from cards 320A-320D and desires to select a different card. Pressing button 361, in some embodiments presents interface 310 in FIG. 3A to user 135.

FIG. 3C is a diagram of an exemplary interface 312 displaying a confirmation that a pre-authorization request has been approved, consistent with disclosed embodiments.

In exemplary FIG. 3C, interface 312 is depicted as being displayed on mobile device 130 as part of a mobile wallet application. It is to be understood, however, that not all embodiments require interface 312 to be implemented as part of a mobile wallet application. For example, interface 312 can be displayed on mobile device 130, a personal computer, or the like, as part of a web site hosted by financial service provider system 112.

In some embodiments, interface 312 may be presented to user 135 after user 135 has selected a card 320A-320D and pressed button 330, as shown in FIG. 3A. In other embodiments, interface 312 may be presented to user 135 after user 135 has selected a card as in FIG. 3A and/or input an approximate dollar value in dollar field 340 as shown in FIG. 3B. Interface 312 may include confirmation 370 and button 371.

Confirmation 370 may serve to inform user 135 that a pre-authorization request has been approved. This may give user 135 confidence that a future transaction corresponding to the parameters associated with the pre-authorization request (e.g. the particular card selected and/or a dollar value specified) will be approved, which may serve to prevent denial of a transaction that would otherwise appear potentially fraudulent. Confirmation 370 may also include validity period, which indicates how long the approval is valid for.

Figure 3D:
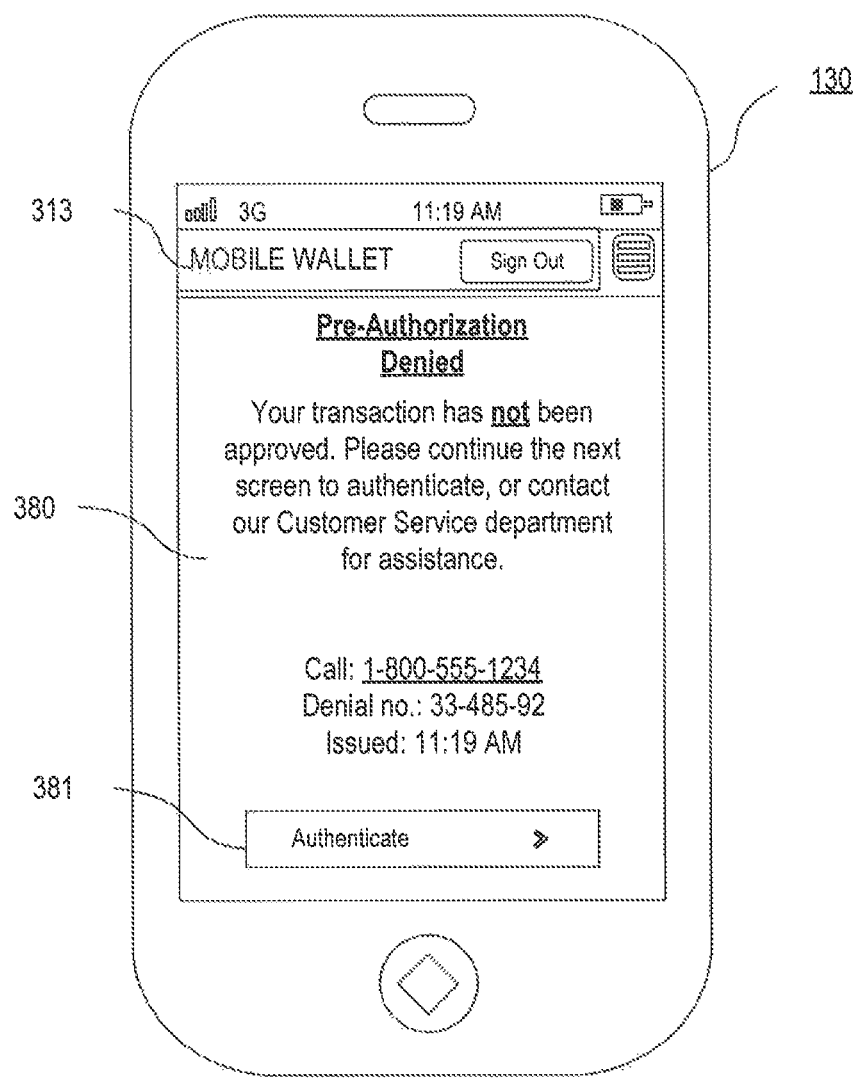
FIG. 3D is a diagram of an exemplary interface displaying a denial of a pre-authorization request, consistent with disclosed embodiments.

FIG. 3D is a diagram of exemplary interface 313 displaying a denial of a pre-authorization request, consistent with disclosed embodiments. In exemplary FIG. 3D, interface 313 is depicted as being displayed on mobile device 130 as part of a mobile wallet application. It is to be understood, however, that not all embodiments require interface 313 to be implemented as part of a mobile wallet application. For example, interface 313 can be displayed on mobile device 130, a personal computer, or the like, as part of a web site hosted by financial service provider system 112.

In some embodiments, interface 313 may be presented to user 135 have user 135 has selected a card 320A-320D and pressed button 330, as shown in FIG. 3A. In other embodiments, interface 313 may be presented to user 135 after user 135 has selected a card as in FIG. 3A and/or input an approximate dollar value in dollar field 340 as shown in FIG. 3B. Interface 313 may include denial 380 and button 381.

Denial 380 may serve to inform user 135 that a pre-authorization request has been denied. Denial of a pre-authorization request could occur because an approximate dollar value associated with the pre-authorization request exceeds a pre-set amount associated with the card or account, because a transaction with the approximate dollar amount would exceed a credit limit associated with the card or account, because the card or account is closed or suspended, because the pre-authorization request appears fraudulent, or the like. According to some embodiments, denial 380 may further provide one or more reason(s) why the pre-authorization request was denied (e.g., the pre-authorization request indicated a dollar amount that would exceed the credit limit associated with the card or account, the card has been reported as stolen or missing, and/or any other factor capable of raising the risk of fraud, default, etc.).

In some embodiments, denial 380 may inform user 135 that further authorization is required from user 135. For example, if a pre-authorization request appears fraudulent, interface 313 may present button to enable user 135 to provide further information in order to authenticate the pre-authentication request. Interface 313 may receive a press at button 381 and proceed to a new interface (not pictured) to receive further authentication from user 135, such as a password, a PIN, biometric identification, or the like. In other embodiments, denial 380 may present a phone number which, if dialed by user 135, connects user 135 to a pre-recorded message informing user 135 why the pre-authorization request was denied and/or connects user 135 to a live operator that can assist the user in obtaining a confirmation for the pre-authorization request.

FIG. 4A is a flowchart of an exemplary process 400 for pre-authorizing a transaction request. In step 401, an application (such as a mobile wallet application or web site) may be initialized by mobile device 130. Mobile device 130, in step 403, may prompt user 135 to select a card or account with which user 135 is intending on making a purchase via, for example, interface 310 in FIG. 3A. As explained above with reference to FIG. 3A, mobile device 130 may present a set of cards and may receive a selection of at least one of those cards (or accounts) for use with an upcoming transaction.

In step 404, mobile device 130 may prompt user 135 to input an approximate amount for the upcoming transaction. As explained above with reference to FIG. 3B, the approximate amount may be received in a variety of input means. After inputting the approximate amount, process 400 may continue to step 405. Step 404, however is optional and may not be executed in all embodiments. In those embodiments, process 400 can proceed directly from step 403 to 405.

After prompting user 135 to select a card or account (step 403) and/or prompting user 135 to input an approximate amount for the upcoming transaction (step 404), in step 405, mobile device 130 may generate a pre-authorization request for sending to card authorization system 116. The pre-authorization request may include the selected card or account (from step 403), an approximate amount for the upcoming transaction (from step 404), and/or a location of mobile device 130 (e.g., a geographic location such as latitude or longitude coordinates or an address). Mobile device 130 may also send that pre-authorization request to card authorization system 116.

In step 407, card authorization system 116 may receive the pre-authorization request. In step 409, card authorization system 116 may perform a set of validity checks on the received pre-authorization request. For example, card authorization system 116 may attempt to verify the identity of user 135 or mobile device 130, may examine the pre-authorization request for data transmission or security issues, may determine whether the card or account referenced in the pre-authorization request is in good standing (e.g., not overdrawn, unpaid, or charged off), may determine whether the dollar value referenced in the pre-authorization request would cause the card or account to exceed a credit limit, or the like.

If card authorization system 116 determines that the pre-authorization request is valid and should be granted, then in step 411, card authorization system 116 may generate a pre-authorization for sending to mobile device 130. The pre-authorization includes, for example, an approval number that indicates to mobile device 130 and user 135 that the pre-authorization request was granted. In some embodiments, pre-authorizations are also associated with a time stamp that indicates a validity period, after which the pre-authorization will "expire" and no longer be valid. So, if a transaction request is received and an associated pre-authorization has expired, the transaction request will not be determined to be "associated" with that pre-authorization.

Card authorization system 116 may send an indication of the pre-authorization to mobile device 130. In step 413, mobile device 130 may receive the pre-authorization. Mobile device may, as explained above with reference to FIG. 3C, present an indication to user 135 that the pre-authorization was received. This gives user 135 confidence that a transaction in line with the parameters associated with the pre-authorization request sent in step 405 will be approved, which may serve to prevent denial of a transaction even if the transaction otherwise appears potentially fraudulent.

FIG. 4B is a flowchart of an exemplary process 410 for processing a transaction request initiated at merchant system 122. In step 421, merchant system 122 may initialize a transaction. This may comprise, for example, receiving physical items from user 135 for scanning at a physical point-of-sale device, determining items added to an online shopping cart by user 135, or the like. Step 421 may also comprise receiving a card or account identifier that user 135 wishes to use to pay for the transaction. This includes, for example, receiving a physical payment card and swiping it through a magnetic swipe reader, receiving an NFC-based communication that includes a payment card number, receiving an a card number entered by user 135 on a web site associated with merchant device 122, or the like.

In step 423, merchant system 122 may generate a transaction request and send it to financial service provider system 112. The transaction request may include a card or account that user 135 is attempting to use to effect the transaction, a dollar values associated with the transaction, a location of merchant 122 (e.g., a geographic location such as latitude and longitude coordinates or a street address, and other information as necessary (e.g., authentication information). In step 425, financial service provider 112 may receive the transaction request and forward it to the appropriate subsystem, e.g., card authorization system 116.

In step 427, card authorization system 116 may determine whether the received transaction is associated with a pre-authorization. Card authorization system 116 may determine that a transaction is associated with a pre-authorization if, for example, the received transaction includes a reference to a card or account that is associated with a pre-authorization.

Determining that a received transaction is associated with a pre-authorization may also comprise, in some embodiments, determining whether a dollar value associated with the received transaction is within some percentage of a dollar value associated with a pre-authorization. As one example, card authorization system 116 may determine that a received transaction is only associated with a pre-authorization if the received transaction references a card also referenced by the pre-authorization and is within 15% of a dollar value associated with the pre-authorization. Otherwise, card authorization system 116 may determine that the received transaction is not associated with that pre-authorization. As another example, card authorization system 116 may determine that a received transaction is only associated with a pre-authorization if the transaction is within some percentage of a dollar value associated with the pre-authorization, the percentage being based on the amount of the pre-authorization. For example, a pre-authorization for less than $1,000.00 would be associated with a transaction if the transaction and pre-authorization differed by less than 10%, while a pre-authorization for more than $1,000.00 would be associated with a transaction if the transaction and pre-authorization differed by less than 5%.

Determining that a received transaction is associated with a particular pre-authorization may also comprise, in some embodiments, determining whether the current date and time are within a validity period associated with the pre-authorization. For example, the pre-authorization may be associated with a 30-minute or one-day window during which transaction requests can be "associated" with the pre-authorization. Conversely, if the transaction request is received outside of that window, card authorization system 116 may determine that the transaction request is not associated with the pre-authorization.

Determining that a received transaction is associated with a particular pre-authorization may also comprise, in some embodiments, determining whether a location of merchant 122 included in the transaction request is within some distance of a location of mobile device 130 associated with the pre-authorization.

In some embodiments, step 427 may also comprise card authorization system 116 determining whether the card or account referenced in the transaction is in good standing (e.g., not overdrawn, unpaid, or charged off), determining whether the dollar value referenced in the transaction would cause the card or account to exceed a credit limit, or the like. (Card authorization system 116 may be configured in these embodiments to send an indication to financial service provider system 112 indicating that the transaction should be denied.)

In situations where a received transaction is not associated with a pre-authorization, card authorization system 116 may send the transaction to fraud detection system 114 with an indication that it is not associated with a pre-authorization. In step 429, fraud detection system 114 may determine whether the transaction passes fraud checks. This includes, for example, determining whether the transaction is an outlier from previous transactions (e.g., is received from a merchant that user 135 does not frequent, is received from a merchant in a geographic area that user 135 is not known to frequent, contains a dollar value significantly higher than other transactions associated with user 135) or otherwise appears fraudulent.

In some embodiments determining whether a transaction passes fraud checks comprises fraud detection system 114 generating a cumulative score associated with the transaction. For example, a cumulative score associated with the transaction may be based on a multitude of aspects associated with the transaction, each aspect being associated with a score reflective of whether that aspect indicates that the transaction request is fraudulent. Example aspects include a number of transactions performed in the past 24 hours, a distance between a location associated with a current transaction request and the last five transactions, a difference in dollar value between this transaction and the previous 10 transactions, or the like. In some embodiments, the more likely that a particular aspect is to make the transaction appear fraudulent, the higher a score associated with the aspect. The scores associated with each aspect may then be added together to obtain the cumulative score. A higher cumulative score may represent a greater likelihood that the associated transaction is fraudulent. For example, a score between 0 and 500 may be considered as "not likely fraudulent," a score of 501 to 1000 may be considered as "likely fraudulent," and a score above 1000 may be considered as "fraudulent." (It is to be understood, however, that not all embodiments require these particular scores.)

If fraud detection system 114 generates a score associated with a transaction and determines that the score is outside of an acceptable range (e.g., higher than a range of scores associated with "not likely fraudulent" transactions), fraud detection system 114 may determine that the transaction is likely fraudulent and should be denied, and forwards the transaction with that indication to financial service provider system 112. For example, if the transaction is not associated with a pre-authorization, fraud detection system may determine that the transaction is likely fraudulent if an associated score is 501 or above. Financial service provider system 112 may generate a denial (step 431) and send it to merchant system 112, which receives the denial in step 435. (User 135 can then be informed that the transaction was denied, and can retry the transaction, contact financial service provider 110, or take other actions.)

If, on the other hand, the cumulative score generated by fraud detection system 114 is within an acceptable range (e.g., between 1 and 500), fraud detection system 114 may determine that the transaction is not likely to be fraudulent and should be approved, and forwards the transaction with an indication that it should be approved to financial service provider system 112. Financial service provider system 112 may generate an approval (step 433) and send it to merchant system 112, which receives it in step 435.

If, however, in step 427, card authorization system 116 determines that a received transaction is associated with a pre-authorization, then, in some embodiments, card authorization system 116 may determine that the transaction should be approved. Card authorization system 116 may forward the transaction with an indication that it should be approved to financial service provider system 112. Financial service provider system 112 may generate an approval (step 433) and send it to merchant system 112, which receives it in step 435.

In some embodiments, however, if card authorization system 116 determines that a received transaction is associated with a pre-authorization, card authorization system 116 sends an indication to fraud detection system 114 to perform fraud checks on the transaction. Fraud detection system 114 may perform a set of validity checks on transactions that are not associated with a pre-authorization, while fraud detection system 114 may perform only a subset of those validity checks on transactions that are associated with a pre-authorization. In other embodiments, fraud detection system 114 may generate a cumulative score associated with the transaction and determine that the transaction is not fraudulent so long as the cumulative score is not higher than some threshold (e.g., higher than a range of scores associated with "fraudulent" transactions).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A system for authorizing transactions, comprising:
at least one processing device; and
at least one storage medium comprising instructions that when executed cause the at least one processing device to perform a method comprising:
receiving, over a network, a transaction request from a first device, the transaction request comprising a merchant location, a requested payment method, and a transaction amount;
determining, via a global positioning system, that the merchant location included in the transaction request is within a threshold distance of a location of a second device that generated a pre-authorization for a transaction, wherein the pre-authorization comprises a pre-authorized amount for a pre-authorized payment method;
determining, based on comparing the requested payment method and the pre-authorized payment method, that the transaction request does not match the pre-authorization;
in response to determining that the transaction request does not match the pre-authorization, generating a request for a fraud score and transmitting the transaction request to a fraud detection system;
receiving, from the fraud detection system, the fraud score associated with the transaction request;
determining whether the fraud score is less than a threshold; and
in response to determining that the fraud score is less than the threshold, processing the transaction request for the transaction.

2. The system of claim 1, wherein receiving the transaction request comprises receiving the transaction request from the first device associated with a merchant.

3. The system of claim 1, wherein the pre-authorization further comprises a pre-authorized location.

4. The system of claim 3, wherein the method performed by the at least one processing device further comprises:
receiving, from the second device, location data indicative of a current location of the second device, wherein the second device is associated with a user.

5. The system of claim 3, wherein the pre-authorized location is associated with the merchant location.

6. The system of claim 1, wherein the pre-authorization comprises a pre-authorized validity period.

7. The system of claim 6, wherein the method performed by the at least one processing device further comprises:
receiving, from the second device, a timestamp associated with the transaction request, the timestamp comprising a date;

determining whether the date is within the pre-authorized validity period; and processing the transaction request when the date is within the pre-authorized validity period.

8. The system of claim 1, wherein processing the transaction request comprises transmitting an indication that the transaction request is approved to a financial service provider associated with the requested payment method.

9. The system of claim 1, wherein the pre-authorized payment method is selected by a user via a mobile wallet application on the second device.

10. The system of claim 9, wherein the method performed by the at least one processing device further comprises:

determining that the transaction request is not associated with the pre-authorization; and processing the transaction request when the fraud score is higher than a third threshold, wherein the third threshold comprises a predetermined lowest score for instances wherein the transaction request is not associated with the pre-authorization.

11. A computer-implemented method for authorizing a transaction, comprising:

receiving, over a network, a transaction request for the transaction from a first device, the transaction request comprising a merchant location, a requested payment method, and a transaction amount;

determining, via a global positioning system, that the merchant location included in the transaction request is within a threshold distance of a location of a second device that generated a pre-authorization for the transaction, wherein the pre-authorization comprises a pre-authorized amount for a pre-authorized payment method;

determining, based on comparing the requested payment method and the pre-authorized payment method, that the transaction request does not match the pre-authorization;

in response to determining that the transaction request does not match the pre-authorization, generating a request for a fraud score and transmitting the transaction request to a fraud detection system;

receiving, from the fraud detection system, a fraud score associated with the transaction request;

determining whether the fraud score is less than a threshold; and in response to determining that the fraud score is less than the threshold, processing the transaction request for the transaction.

12. The computer-implemented method of claim 11, further comprising processing the transaction request when the fraud score is between the threshold and a second threshold, wherein the second threshold is based on a predetermined lowest score at which a pre-authorized transaction can be approved.

13. The computer-implemented method of claim 11, wherein the transaction request further comprises at least one of a geographic location, a validity period, or an indication of a merchant.

14. The computer-implemented method of claim 11, further comprising:

determining whether the transaction is within a percentage of the pre-authorized amount.

15. The computer-implemented method of claim 14, wherein the percentage is associated with an estimated tax on the pre-authorized amount.

16. The computer-implemented method of claim 15, wherein the percentage is pre-configured by a user associated with the pre-authorization.

17. The computer-implemented method of claim 11, further comprising:

determining, based on a balance associated with the requested payment method, whether processing the transaction request will cause the balance to exceed a credit limit associated with the requested payment method; and processing the transaction request when the credit limit is not exceeded.

18. The computer-implemented method of claim 11, further comprising:

determining that the transaction request is not associated with the pre-authorization; and processing the transaction request when the fraud score is higher than a third threshold, wherein the third threshold comprises a predetermined lowest score for instances, wherein the transaction request is not associated with the pre-authorization.

19. The computer-implemented method of claim 18, wherein the third threshold is less than the threshold.

* * * * *